(12) United States Patent
Hoffmann et al.

(10) Patent No.: US 7,414,235 B2
(45) Date of Patent: *Aug. 19, 2008

(54) HANDHELD LOCATING DEVICE WITH A SENSOR FOR DETECTING MOTION PARAMETERS

(75) Inventors: Erhard Hoffmann, Leinfelden-Echterdingen (DE); Uwe Skultety-Betz, Leinfelden-Echterdingen (DE); Stefan Clauss, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 243 days.

This patent is subject to a terminal disclaimer.

(21) Appl. No.: 10/487,316

(22) PCT Filed: Nov. 12, 2002

(86) PCT No.: PCT/DE02/04169

§ 371 (c)(1),
(2), (4) Date: Feb. 20, 2004

(87) PCT Pub. No.: WO03/067264

PCT Pub. Date: Aug. 14, 2003

(65) Prior Publication Data

US 2004/0211891 A1    Oct. 28, 2004

(30) Foreign Application Priority Data

Feb. 7, 2002   (DE) ............................... 102 05 001

(51) Int. Cl.
*G01B 3/12*   (2006.01)
*G01B 5/00*   (2006.01)
*G01B 5/004*  (2006.01)

(52) U.S. Cl. .................. 250/221; 250/222.1; 33/773; 33/775; 33/779; 33/782; 33/124

(58) Field of Classification Search ............... 250/221, 250/227.22, 234–236, 559.29, 559.42, 548, 250/222.1; 345/163–167; 33/121, 122, 124, 33/533, 772, 773, 775, 779–782; 358/473, 358/474, 488
See application file for complete search history.

(56) References Cited

U.S. PATENT DOCUMENTS 4,754,103 A * 6/1988 De Bisschop et al. ........ 345/175

(Continued)

FOREIGN PATENT DOCUMENTS

DE    41 22 398    1/1993

(Continued)

OTHER PUBLICATIONS

Patent Abstracts of Japan BD. 1996, NR. 09, Sep. 1996 & JP 8 114439 A, May 7, 1996.

(Continued)

*Primary Examiner*—Davienne Monbleau
(74) *Attorney, Agent, or Firm*—Michael J. Striker

(57) ABSTRACT

A handheld device. In particular a locating device, includes a housing (10), which is movable with a handle unit (12) over a surface of an item being examined and which has a sensor unit (16) for picking up a first motion parameter. At least one second motion parameter can be detected with the sensor unit (16).

31 Claims, 2 Drawing Sheets

U.S. PATENT DOCUMENTS

| | | | |
|---|---|---|---|
| 4,797,544 A * | 1/1989 | Montgomery et al. | 250/221 |
| 4,906,843 A * | 3/1990 | Jones et al. | 250/221 |
| 5,107,598 A * | 4/1992 | Woznow et al. | 33/521 |
| 5,306,908 A * | 4/1994 | McConica et al. | 250/234 |
| 5,446,559 A * | 8/1995 | Birk | 358/473 |
| 5,577,330 A * | 11/1996 | Cheng | 33/772 |
| 5,861,622 A * | 1/1999 | Tsai | 250/234 |
| 6,200,219 B1 * | 3/2001 | Rudell et al. | 345/163 |
| 6,618,954 B2 * | 9/2003 | Kumazawa et al. | 33/533 |
| 6,725,553 B2 * | 4/2004 | Airey et al. | 33/320 |
| 2001/0052581 A1 | 12/2001 | Bohn | |
| 2002/0175849 A1 * | 11/2002 | Arndt et al. | 342/22 |

FOREIGN PATENT DOCUMENTS

| | | |
|---|---|---|
| DE | 41 22 398 A | 1/1993 |
| DE | 43 23 182 | 7/1994 |
| DE | 43 23 182 C | 7/1994 |
| JP | 05231805 A * | 9/1993 |

OTHER PUBLICATIONS

Patent Abstracts of Japan BD. 0172, NR. 56 (M-1413), May 20, 1993 & JP 4 372409 A, Dec. 25, 1992.

* cited by examiner

HANDHELD LOCATING DEVICE WITH A SENSOR FOR DETECTING MOTION PARAMETERS

CROSS-REFERENCE

The invention described and claimed hereinbelow is also described in PCT/DE 02/04169, filed on Nov. 12, 2002 and DE 102 05 001.5, filed Feb. 7, 2002. This German Patent Application, whose subject matter is incorporated here by reference, provides the basis for a claim of priority of invention under 35 U.S.C. 119 (a)-(d).

BACKGROUND OF THE INVENTION

The invention is based on a handheld locating device.

A handheld locating device is known that has a running gear with four wheels, and two wheels are mounted on each long side of the locating device. The opposed wheels are each connected via an axle extending perpendicular to the longitudinal length of the locating device. On a top side of its housing, the locating device has a handle unit extending in the direction of the longitudinal length, and with this unit the locating device can be moved, with the running surfaces of the wheels, over a surface of an item being examined in the direction of its longitudinal length.

For picking up a motion parameter by means of a sensor unit, the two rigid axles and the sensor unit are mechanically coupled via a toothed belt.

SUMMARY OF THE INVENTION

The invention is based on a handheld device, in particular a locating device, having a housing, which is movable with a handle unit over a surface of an item being examined and which has a sensor unit for picking up a first motion parameter.

It is proposed that at least one second motion parameter can be detected with the sensor unit. Advantageously, additional information can be detected, such as information pertaining to the spacing of the housing from the surface of the item being examined and/or information about a motion of the housing along a curved path, and so forth. With this additional information, measurement results can be corrected and errors of measurement can advantageously be at least reduced, in particular by means of comparing the motion parameters with one another. Moreover, errors of measurement, particularly errors caused by an unintentional change in a direction of motion, can be shown on a display and corrected manually and/or automatically via actuators. In addition, if the sensor unit should fail with regard to detecting the first motion parameter, an at least partly usable measurement result can be achieved with the second motion parameter, especially if the second motion parameter is of the same type as the first motion parameter.

If a parameter for a rotary motion of the housing about at least one axis can be ascertained from the motion parameters detected, then it is simple to conclude that an unwanted motion of the housing has occurred, especially if the axis extends in the direction of the normal to the surface of the item being examined.

In a further feature of the invention, it is proposed that the sensor unit has at least two sensors. Advantageously, a structurally simple and economical device with which two motion parameters can be detected simultaneously can be achieved using standard components.

Advantageously, the sensors are formed at least in part by electronic components. Space-saving, economical, accurate sensors can be used, whose signals can be output in electronic form and further processed electronically in a simple way. The motion parameters can be detected via touch contacts or in noncontacting fashion. If the motion parameters are detected without contact, friction between corresponding components can then advantageously be avoided, and user convenience can be enhanced. The sensors for the contactless detection can be designed for various input variables that appear appropriate to one skilled in the art, such as magnetic, electric, optical and/or thermal input variables.

In a further feature of the invention, it is proposed that the sensor unit has at least one optoelectronic sensor, by way of which at least one of the two motion parameters can be detected from the face of the item being examined without contact. Advantageously, an especially convenient measurement operation can be attained in which the housing can be moved in noncontacting fashion over various paths of motion over the surface of the item being examined, for instance over a straight path, a curved path with a sweeping motion, or over a circular path, and so forth.

It is also proposed that a running gear is disposed on the housing and has at least one first rolling body, by way of which at least the first motion parameter can be detected. Advantageously, the first motion parameter can be ascertained structurally simply and economically by way of a rolling motion of the rolling body over the surface of the item being examined.

If the running gear has at least one second rolling body, by way of which at least the second motion parameter can be detected, then a mistake in manipulation by the user can be detected structurally simply, by comparing the motion parameters of the two rolling bodies, and in particular their rotary speeds, with one another. In addition, at least one rolling body can be controlled or braked or accelerated via an actuator, so that if the two rolling bodies have different motion parameters, these motion parameters can be adapted to one another.

The rolling bodies can be mounted separately from one another on the housing or connected to one another via common axles. If at least two rolling bodies are connected to a rigid axle in a manner fixed against relative rotation, then an advantageous guidance property of the device can be achieved.

The motion parameters can be detected directly via the individual rolling bodies and/or via the axles of the rolling bodies. If at least one further rolling body is connected to a second axle in a manner fixed against relative rotation, and the first motion parameter can be detected via the first axle and the second motion parameter can be detected via the second axle, then a mistake in operation of the handheld device, such as raising at least one rolling body away from the surface of the item being examined or an unintentional movement of the housing along a curved path, can be detected especially advantageously via a comparison of the motion parameters of the two axles. Moreover, the guidance properties can be improved still further.

If the housing is movable in two preferred, opposed direction of motions, and if the direction of motion can be determined via the sensor unit, then upon a change of direction turning the housing around and realigning the housing can advantageously be avoided. Moreover, a simple readout of a display, especially an LCD screen, on the housing can always be assured.

In a further feature of the invention, it is proposed that the preferred direction of motion extends transversely to the longitudinal length of the housing. The housing, or the device, can be moved far into a corner with a measurement unit, in particular a measurement unit for locating objects, and measurement can be performed until far into the corner. If the device can be moved in two opposite directions during a measurement operation or a locating operation, then the device can especially advantageously be moved into two opposed corners, so that turning the device around can be avoided. Advantageous accessibility to corners is attainable.

If at least one measurement unit is disposed in the housing in the longitudinal length of the housing in an end region, then the housing can furthermore advantageously be moved with its measurement unit closely along a corner.

BRIEF DESCRIPTION OF THE DRAWINGS

Further advantages will become apparent from the ensuing drawing description. In the drawing, one exemplary embodiment of the invention is shown. The drawing, description and claims include numerous characteristics in combination. One skilled in the art will expediently assess the characteristics individually as well and put them together to make useful further combinations.

Shown are.

DETAILED DESCRIPTION OF THE PREFERRED EMBODIMENTS

Figure 1:
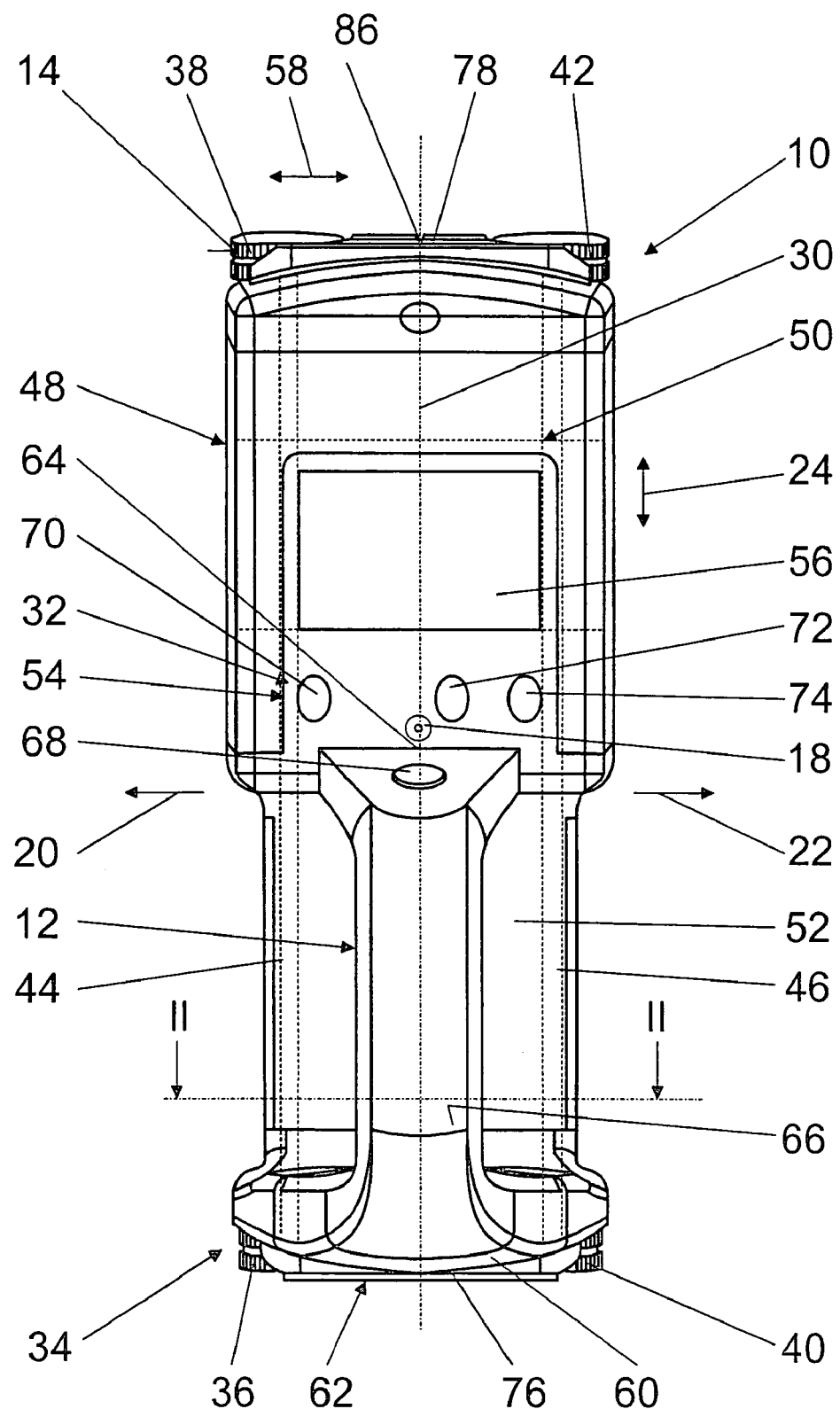
FIG. 1, a locating device in a plan view.
Figure 2:
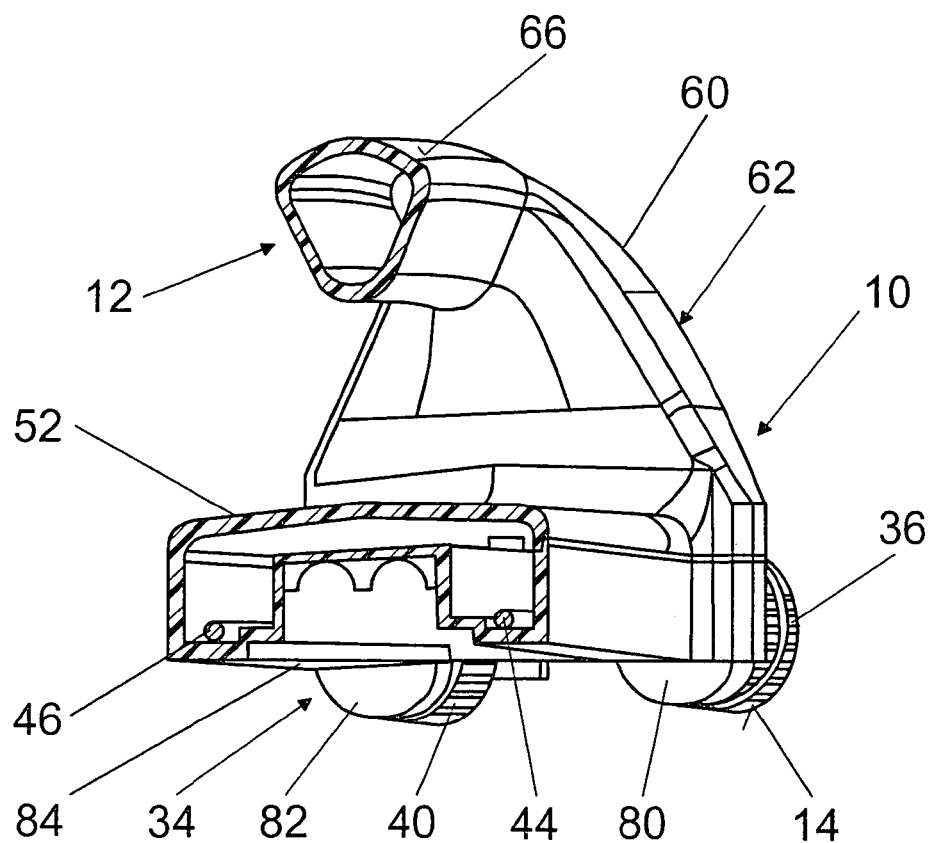
FIG. 2, a section taken along the line II-II in FIG. 1.

FIG. 1 shows a presented locating device, with a housing 10 and a running gear 34. The housing 10 of the locating device is movable in two preferred, opposed direction of motions 20, 22, which extend perpendicular to a longitudinal length 24 of the housing 10. On its top side 52, it has a handle unit 12, formed by a hooplike handle, with a handle face 66. The handle unit 12 extends in the longitudinal length 24 of the housing 10 and is embodied symmetrically to a plane that is defined by a longitudinal center axis 30 and a normal to the top side 52 (see FIG. 1). The handle unit 12 has a diamond-shaped cross-sectional area that narrows in the direction of the top side 52, and with its first end 60, which points in the longitudinal length 24 of the housing 10 toward an end region 62 of the housing 10, it merges with the housing 10, while with its second end 64, the handle unit 12 ends at the top side 52 of the housing 10 (FIGS. 1 and 2).

On its second end 64, the handle unit 12 has a first user control element 68 (FIG. 1), downstream of the handle face 66 in the longitudinal length 24 in the direction of an LCD screen 56. Downstream of the handle unit 12 in the longitudinal length 24 of the housing 10 in the direction of the LCD screen 56, which is formed by a monochromatic screen but can also be formed by a color screen, there is a user control panel 54 with three user control elements 70, 72, 74; the user control elements 70, 72, 74 are disposed in a region 32 with a radius of approximately 25 mm located toward the end 64 of the handle unit 12. A user can guide the locating device with one hand using the handle unit 12 and at the same time operate the user control elements 68, 70, 72 and 74, preferably with his thumb.

The handle unit 12 protrudes past the top side 52 of the locating device and forms a roll bar for protecting the LCD screen 56. In an end region 48 in the longitudinal length 24 of the housing 10, below the LCD screen 56, the locating device has a measurement unit 50; a transverse length 58 of the housing is essentially equivalent to a width of the measurement unit 50, specifically being approximately 100 mm (FIG. 1).

The locating device has four rolling bodies 36, 38, 40, 42, embodied as wheels, disposed in the longitudinal length 24 on opposite face ends 76, 78 in the transverse length 58 in the outer region (FIG. 1). It is also conceivable to equip the locating device with only three rolling bodies; in that case, two rolling bodies can be disposed on one face end, and a single rolling body can be disposed on an opposite face end. The rolling bodies 36, 38, 40, 42 opposite one another in the longitudinal length 24 are connected to one another in a manner fixed against relative rotation via rigid axles 44, 46, and the rigid axles 44, 46 pass through the measurement unit 50.

Protrusions 80, 82 which essentially have the shape of a disklike circular segment (FIGS. 2 and 3) are formed onto an underside 84 of the housing 10, for the protection of the rolling bodies 36, 38, 40, 42.

Figure 3:
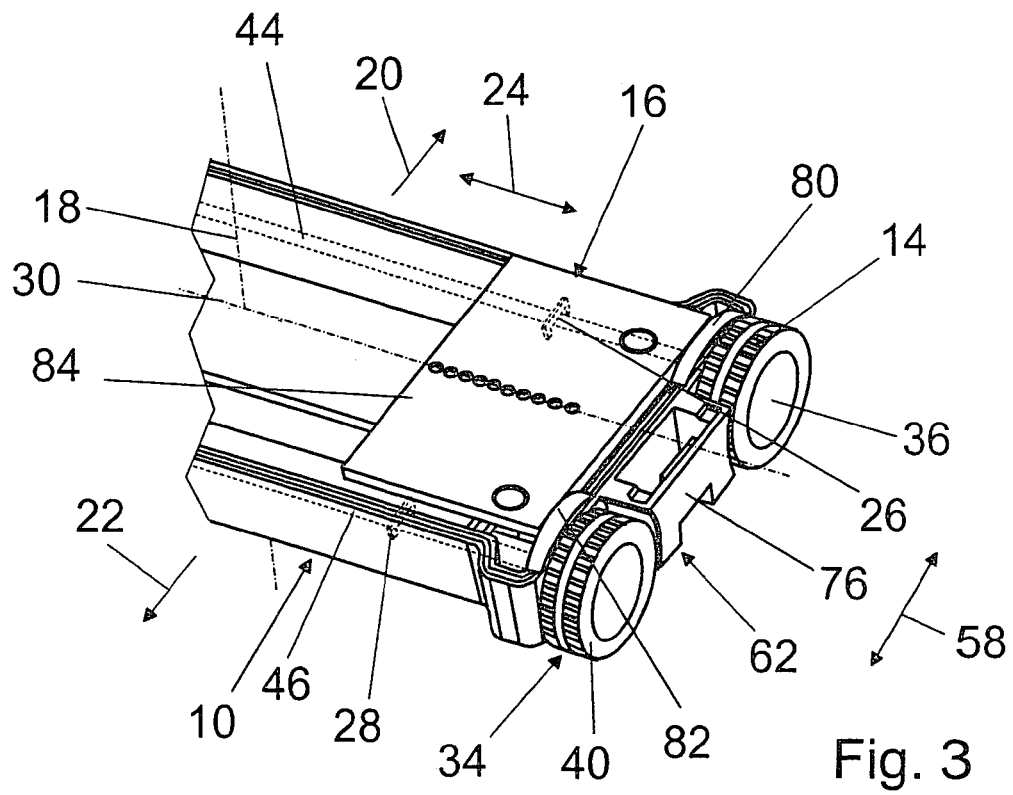
FIG. 3, a detail of an underside of the locating device of FIG. 1.

For picking up motion parameters, the locating device has a sensor unit 16 with two sensors 26, 28, with which a first and a second motion parameter can be detected (FIG. 3). The sensors 26, 28 of the sensor unit 16 are formed by optoelectronic components, specifically bifurcated light gates. For detecting the motion parameters, one sensor 26, 28 is coupled with a respective axle 44, 46 of the running gear 34, so that the first motion parameter can be detected via the first axle 44, and the second motion parameter can be detected via the second axle 46.

Segmented wheels, not shown, are slipped onto the axles 44, 46 and are moved by the bifurcated light gates that form the sensors 26, 28. If the sensors 26, 28 each have two light gates per segmented wheel, and the light gates have a suitable offset from one another, then advantageously the direction of motion 20, 22 of at least one axle of the locating device can be determined with the sensor unit 16 by way of a phase relationship of the two output signals.

If a user moves the housing 10 over the surface of a item being examined, the rolling bodies 36, 38, 40, 42 of the running gear 34 roll with their surfaces 14 on the surface of the item being examined. The axles 44, 46 are rotated with the rolling bodies 36, 38, 40, 42 and the segmented wheels are rotated with the axles 44, 46.

The motion parameters or rotary speeds of the axles 44, 46 detected by the sensors 26, 28 are compared in an evaluation unit, not shown, so that from the motion parameters, a conclusion can be drawn about a parameter for a rotary motion of the housing 10 about an axis 18 that extends in the direction of the normal to the surface of the item being examined.

If in the motion of the locating device over an item being examined, an object is shown on the LCD screen 56, then a notch 86, which is embodied on one face end 78 of the housing 10, indicates the position of that object in the item being examined relative to the housing 10.

LIST OF REFERENCE NUMERALS

10 Housing
12 Handle unit
14 Surface
16 Sensor unit
18 Axis
20 Direction of motion
22 Direction of motion
24 Longitudinal length
26 Sensor
28 Sensor 30 Longitudinal center axis
32 Region
34 Running gear
36 Rolling body
38 Rolling body
40 Rolling body
42 Rolling body
44 Axle
46 Axle
48 End region
50 Measurement unit
52 Top side
54 User control panel
56 LCD screen
58 Transverse length
60 End
62 End region
64 End
66 Handle face
68 User control element
70 User control element
72 User control element
74 User control element
76 Face end
78 Face end
80 Protrusion
82 Protrusion
84 Underside
86 Notch

The invention claimed is:

1. A locating device, having a housing (10), which is movable with a handle unit (12) over a surface of an item being examined and having a measurement unit for locating objects in said examined item and which has a sensor unit (16) for picking up a first motion parameter, wherein at least one second motion parameter can be detected with the sensor unit (16), wherein a running gear is disposed on the housing, wherein the running gear has one first rolling body, wherein the first motion parameter is detected by said one first rolling body, wherein the running gear has at least one second rolling body, wherein at least one second motion parameter is detected by said at least the one second rolling body, and wherein the first and second bodies roll on the surface of the item being examined when the housing is moved over said surface.

2. The locating device of claim 1, wherein from the motion parameters detected, a parameter for a rotary motion of the housing (10) about at least one axis (18) can be ascertained.

3. The locating device of claim 1, wherein the sensor unit (16) has at least two sensors (26, 28).

4. The locating device of claim 3, wherein the sensors (26, 28) are embodied at least in part by electronic components.

5. The locating device of claim 4, wherein the sensor unit (16) has at least one optoelectronic sensor (26, 28), by way of which at least one of the two motion parameters can be detected from the face of the item being examined without contact.

6. The locating device of claim 1, wherein the at least two rolling bodies (36, 38) are connected to a first axle (44) in a manner fixed against relative rotation.

7. The locating device of claim 6, wherein at least one further rolling body (40, 42) is connected to a second axle (46) in a manner fixed against relative rotation, and the first motion parameter can be detected via the first axle (44) and the second motion parameter can be detected via the second axle (46).

8. The locating device of claim 1, wherein the housing (10) is movable in two opposed direction of motions (20, 22), and the direction of motion (20, 22) can be determined via the sensor unit (16).

9. The locating device of claim 8, wherein the direction of motion (20, 22) extends transversely to the longitudinal length (24) of the housing (10).

10. The locating device of claim 9, wherein the measurement unit (50) is disposed in the housing (10), in an end region (48) in terms of the longitudinal length (24) of the housing (10).

11. The locating device of claim 1, further comprising a display for displaying an object in the item to be examined.

12. A handheld device, having a housing, which is moveable with a handle unit over a surface of an item being examined and having a measurement unit for locating objects in said examined item and which has a sensor unit for picking up a first motion parameter, wherein at least one second motion parameter can be detected with the sensor unit, wherein a running gear is disposed on the housing, wherein the running gear has one first rolling body, wherein at least the first motion parameter can be detected by said one first rolling body, wherein the running gear has at least one second rolling body, wherein at least the second motion parameter can be detected by said at least one second rolling body, and wherein the first and second rolling bodies can roll on the surface of the item being examined when the housing is moved over said surface.

13. The handheld device of claim 12, wherein from the motion parameters detected, a parameter for a rotary motion of the housing (10) about at least one axis (18) can be ascertained.

14. The handheld device of claim 12, wherein the sensor unit (16) has at least two sensors (26, 28).

15. The handheld device of claim 14, wherein the sensors (26, 28) are embodied at least in part by electronic components.

16. The handheld device of claim 15, wherein the sensor unit (16) has at least one optoelectronic sensor (26, 28), by way of which at least one of the two motion parameters can be detected from the face of the item being examined without contact.

17. The handheld device of claim 12, wherein at least the first and at least an additional rolling body (36, 38) are connected to a first axle (44) in a manner fixed against relative rotation.

18. The handheld device of claim 17, wherein at least one further rolling body (40, 42) is connected to a second axle (46) in a manner fixed against relative rotation, and the first motion parameter can be detected via the first axle (44) and the second motion parameter can be detected via the second axle (46).

19. The handheld device of claim 12, wherein the housing (10) is movable in two opposed direction of motions (20, 22), and the direction of motion (20, 22) can be determined via the sensor unit (16).

20. The handheld device of claim 19, wherein the direction of motion (20, 22) extends transversely to the longitudinal length (24) of the housing (10).

21. The handheld device of claim 20, wherein the measurement unit (50) is disposed in the housing (10), in an end region (48) in terms of the longitudinal length (24) of the housing (10).

22. The handheld device of claim 12, further comprising a display for displaying an object in the item to be examined.

23. The handheld device of claim 12, consisting of a locating device.

24. A hand held device as defined in claim 12, wherein at least two first rolling bodies are located at one side of a longitudinal center axis of said handheld device, and at least two second rolling bodies are located at a reverse side of the longitudinal center axis of said handheld device.

25. A hand held device as defined in claim 12, wherein said first and second rolling bodies roll in the same direction of rotation.

26. A hand held device as defined in claim 12, wherein said first and second rolling bodies have, respectively, an axis of rotation, wherein said axes of rotation are arranged in parallel to one another.

27. A locating device, having a housing, which is movable with a handle unit over a surface of an item being examined and having a measurement unit for locating objects in said examined item and which has a sensor unit for picking up a first motion parameter, wherein at least one second motion parameter can be detected with the sensor unit, wherein a running gear is disposed on the housing, wherein the running gear has one first rolling body, wherein at least the first motion parameter can be detected by said one first rolling body, wherein the running gear has at least one second rolling body, wherein at least the second motion parameter can be detected by said at least one second rolling body, and wherein the first and second rolling bodies can roll on the surface of the item being examined when the housing is moved over said surface and having at least two first rolling bodies, located at one side of a longitudinal center axis, and at least two second rolling bodies, located at a reverse side of the longitudinal center axis.

28. A locating device as defined in claim 27, wherein said first and second rolling bodies roll in the same direction of rotation.

29. A locating device having, a housing, which is movable with a handle unit over a surface of an item being examined and having a measurement unit for locating objects in said examined item and which has a sensor unit for picking up a first motion parameter, wherein at least one second motion parameter can be detected with the sensor unit, wherein a running gear is disposed on the housing, wherein the running gear has one first rolling body, wherein at least the first motion parameter can be detected by said one first rolling body, wherein the running gear has at least one second rolling body, wherein at least the second motion parameter can be detected by said at least one second rolling body, and wherein the first and second rolling bodies can roll on the surface of the item being examined when the housing is moved over said surface, wherein said first and second rolling bodies have, respectively, an axis of rotation, wherein said axes of rotation are arranged in parallel to one another.

30. A locating device, having a housing, which is movable with a handle unit over a surface of an item being examined and having a measurement unit for locating objects in said examined item and which has a sensor unit for picking up a first motion parameter, wherein at least one second motion parameter can be detected with the sensor unit, wherein a running gear is disposed on the housing, wherein the running gear has one first rolling body, wherein at least the first motion parameter can be detected by said one first rolling body, wherein the running gear has at least one second rolling body, wherein at least the second motion parameter can be detected by said at least one second rolling body, and wherein the first and second rolling bodies can roll on the surface of the item being examined when the housing is moved over said surface and having at least two first rolling bodies, located at one side of a longitudinal center axis, and at least two second rolling bodies, located at a reverse side of the longitudinal center axis, wherein said first and second rolling bodies have, respectively, an axis of rotation, wherein said axes of rotation are arranged in parallel to one another.

31. A locating device a defined in claim 30, wherein at least an axle passes through said measurement unit.

* * * * *